United States Patent

Angros

[11] Patent Number: 5,948,685
[45] Date of Patent: Sep. 7, 1999

[54] ANALYTIC PLATE WITH CONTAINMENT BORDER AND METHOD OF USE

[76] Inventor: Lee Angros, 2013 N. Westaire St., Bethany, Okla. 73008

[21] Appl. No.: 09/021,077

[22] Filed: Feb. 10, 1998

[51] Int. Cl.$^6$ .............................. G01N 33/48; C12M 1/18
[52] U.S. Cl. ........................... 436/63; 422/102; 422/101; 435/288.3; 435/288.4
[58] Field of Search .............................. 422/99, 102–104; 435/288.3–288.4; 436/63

[56] References Cited

U.S. PATENT DOCUMENTS

| | | | |
|---|---|---|---|
| 3,482,898 | 12/1969 | Van Den Bosch | 350/95 |
| 3,579,540 | 5/1971 | Ohlhausen | 260/33.4 |
| 4,447,140 | 5/1984 | Campbell | 350/534 |
| 4,481,246 | 11/1984 | Melisz et al. | 428/210 |
| 5,485,527 | 1/1996 | Bacus et al. | 382/128 |

OTHER PUBLICATIONS

Sigmacote® Brochure, Sigma Chemical Company, P.O. Box 14508, St. Louis, MO 63178, 3 pages, Apr. 28, 1997.
Isolator™ Hydrophobic Marker from Shandon Lipshaw Catalog, one page, available at least one year prior to filing date. No Date Provided.
Kiyota™ Express–PAP PEN Brochure, Kiyota International, Inc. 1940 E. Devon Ave., Elk Grove Village, IL 60007, two pages, available at least one year prior to filing date. No Date Provided.ImmEdge™ Pen Brochure, Vector Labs, Inc., vector@vectorlabs.com, two pages, available at least one year prior to filing date. No Date Provided.
"Introducing Lab–Tek II—The Next Generation" Brochure, Nalge Nunc International, Naperville, IL. Aug. 3, 1996.
Erie Scientific Brochure, Erie Scientific Company, Portsmouth, NH. (Applicant admits that this brochure was published at least one year prior to the filing of the present application submitted herewith). No Date Supplied.

"Adcell—The Next Generation In Printed Diagnostic Slides" Brochure, Erie Scientific Company, Portsmouth, NH. (Application admits that this brochure was published at least one year prior to the filing of the present application submitted herewith). No Date Supplied.
"Our Emphasis On Quality Comes From Knowing Our Work Goes Under A Microscope" Brochure, Erie Scientific Company, Portsmouth, NH. (Applicant admits that this brochure was published at least one year prior to the filing of the present application submitted herewith). No Date Supplied.
"Compatibility of Chamber Slide Components With Various Fixation Reagents", *Tech Note*, vol. 3, No. 20, Nalge Nunc International, Naperville, IL. (Applicant admits that this brochure was published at least one year prior to the filing of the present application submitted herewith). No Date Supplied.
"Compatibility of Chamber Slide Components With Various Fixation Reagents", *Tech Note*, vol. 3, No. 20, Nalge Nunc International, Naperville, IL. (Applicant admits that this brochure was published at least one year prior to the filing of the present application submitted herewith). No Date Supplied.

(List continued on next page.)

*Primary Examiner*—Lyle A. Alexander
*Attorney, Agent, or Firm*—Dunlap, Codding & Rogers,PC

[57] ABSTRACT

An analytic plate such as a microscope slide or a diagnostic plate and kit having the slide or plate, the slide or plate having a containment border for containing a liquid or liquid sample. The containment border is substantially transparent and is substantially flush with the surface of the slide or plate for containing the liquid or liquid sample disposed thereon and thereby preventing spreading or migration of the sample across the slide or plate.

39 Claims, 2 Drawing Sheets

OTHER PUBLICATIONS

"Compatibility of Various Mounting Media On Permanox Slides", *Tech Note*, Nunc, Inc., Naperville, IL. (Applicant admits that this brochure was published at least one year prior to the filing of the present application submitted herewith). No Date Supplied.

"Incubation Chambers For Cell Analysis" Brochure, Lab Vision Corp., Fremont, CA. (Applicant admits that this brochure was published at least one year prior to the filing of the present application submitted herewith). No Date Supplied.

"The Next Generation! Lab–Tek II Chamber Slide System" brochure, Nalge Nunc international, Naperville, IL. 1998.

"Unelko Corporation Material Safety Data Sheet", Unelko Corporation, Scottsdale, AZ, Jul. 1, 1992.

"United Chemical Technologies Information Brochure", United Chemical Technologies, Inc., 1996.

ANALYTIC PLATE WITH CONTAINMENT BORDER AND METHOD OF USE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND

The present invention relates generally to the field of analytic plates such as microscope slides or diagnostic plates and more particularly to such analytic plates having borders thereon.

Standard microscope slides and diagnostic glass plates are thin rectangular sheets of glass or plastic. In use, a sample comprising an aqueous or non-aqueous liquid, liquid reagent, biological fluid and/or biological tissue section(s) is placed upon a portion of the slide or diagnostic glass plate. Before analysis, the sample on the slide or plate may be dried, placed in a fixative, or remain fresh prior to treatment for enhanced visualization by light, electron, or fluorescent microscopy, and/or including gross analysis with the human eye. The sample may be analyzed in its natural state or may need treatment with one or more liquid dyes to enhance visualization. Further treatment with molecular biological techniques may include, for example, treatment by monoclonal, polyclonal antibodies, in-situ hybridization by molecular probes, and/or their liquid detection reagents. During routine analysis or manipulation of a slide or plate, the sample or liquid reagent may spill from the slide, run or migrate onto other portions of the slide, and/or "wick off" if the slide touches another object, thus resulting in a loss of all or part of the liquid sample or reagent. It is desirous to avoid such inadvertent or undesired mixing or contamination of different samples or liquid reagents.

It is therefore beneficial for the slide to have means to confine the sample or liquid used in treating the sample to a specific area on the slide or plate. This has been accomplished previously by creating a slide or plate having one or more depressions, or "wells" therein. Alternatively, a physical barrier or hydrophobic material may be applied to the slide surface in a bordered pattern to confine the liquid applied to the plate within the area surrounded by the border. Such borders may comprise a coating of teflon, paint, wax, paraffin, epoxy resin, or other resinous material, or a paint. Each of these materials results in a border having a thickness resulting in a raised border extending a distance above the surface of the glass, for example, a teflon layer may be about 0.0025 inches high. These raised areas are generally opaque and the end result is a loss of the transparent nature of the slide. In spite of the fact that these raised borders may be somewhat effective in confining the liquid, there continues to be a need for a slide or plate which achieves confinement of the liquid upon a slide while maintaining transparency of the glass or plate. It is the object of the present invention to provide such a slide.

SUMMARY OF THE INVENTION

The present invention contemplates an analytic plate such as a microscope slide or a diagnostic plate having a containment border for inhibiting migration of liquids or liquid samples thereon, wherein the border is substantially transparent and is substantially flush with the surface of the slide or plate and which covers only a portion of the surface of the slide or plate.

DETAILED DESCRIPTION OF THE INVENTION

The present invention contemplates an analytic plate such as a microscope slide or a diagnostic plate having a containment border for inhibiting migration of liquids or liquid samples thereon, wherein the border is substantially transparent and is substantially flush with the surface of the slide or plate and which covers only a portion of the surface of the slide or plate.

Where used herein, the term "analytic plate" refers to those types of plates such as microscope slides and diagnostic plates which are used, for example, in microscopic analysis or diagnostic analysis or comparison of samples. Analytic plates are generally comprised of clear glass or plastic but may also comprise ceramic materials.

Figure 1A:
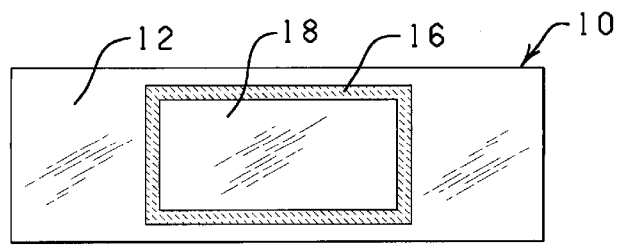
FIG. 1A is a plan view of a microscope slide constructed in accordance with the present invention.
Figure 1B:
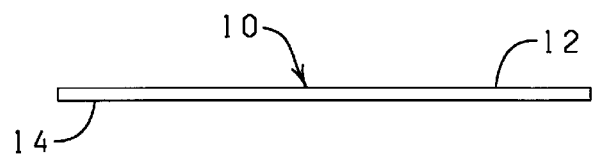
FIG. 1B is a side view of the slide of FIG. 1A.

Referring now to FIGS. 1A and 1B, a glass microscope slide having the general reference numeral 10 is shown. The slide 10 has a conventional length, width and thickness as is well known to one of ordinary skill in the art. The slide 10 has an upper surface 12 and a lower surface 14. Disposed upon a portion of the upper surface 12 is a liquid containment border 16 which in the version of FIG. 1A has a rectangular shape. Where used herein the term "liquid containment border" or "containment border" refers to a transparent border which prevents passage of an aqueous or non-aqueous liquid thereacross. The containment border 16 surrounds a containment area 18 of the upper surface 12 of the slide 10. The containment border 16 forms a liquid barrier about the containment area 18. When a liquid or liquid sample (not shown) is placed upon the containment area 18 of the slide 10 for analysis, the containment border 16 prevents the spreading, leakage or migration of the liquid or liquid sample from the containment area 18, thus causing the sample to be retained in a discrete and confined location upon the slide 10. Where used herein, the term liquid or liquid sample is intended to refer to a liquid material, or a liquid biological sample (e.g., blood, urine, plasma, or cerebrospinal fluid) which is desired to be localized on the slide.

The coating material which is used to form the containment border 16 comprises a material which when applied to the slide 10 is preferably transparent although it may have a color to indicate its position on the slide or have printed, by one of ordinary skill in the art, on the lower surface 14 and/or upper surface 12 of the slide 10 information (lines or numbers or symbols) indicating the position of the liquid border 16 on the upper surface 12. The border 16 forms a molecular layer when dry and therefore is substantially flush (level) with the upper surface 12 of the slide 10. The border 16 is therefore not raised above the upper surface 12 to a degree that is visible to the naked eye. In fact, the containment border 16 typically has a thickness of less than 0.0001 inch and more generally less than 0.00001 inch.

In a preferred embodiment the coating material which forms the containment border 16 is a composition comprising a liquid repellant compound dissolved in a volatile solvent. In a particularly preferred version, the composition comprises an alkyl polysiloxane and a mineral acid mixed with a solvent such as described in U.S. Pat. No. 3,579,540, the specification of which is hereby incorporated herein by reference in its entirety. Other polysiloxanes, silicones and silicon fluids which can permanently or at least temporarily bond to a glass surface and function in accordance with the present invention are also contemplated and are known, and available commercially for use herein. Although a polysiloxane acid mixture is particularly preferred, it will be understood by one of ordinary skill in the art that any material which can adhere to the surface of a glass slide or plate and which forms a substantially non-raised molecular layer as described above is suitable for use in the present invention.

The coating can be applied to the slide 10 in any manner known in the art, for example, by brushing, by using a stamping device or by spraying or by application from a device (pen-like) filled with the coating to be applied to the slides or plates.

In an alternative method of application of the coating for the containment border 16, the analytic slide may be provided with a removable raised layer of a material such as a silicone rubber which is applied as a raised strip on a portion of the upper surface 12 of the slide 10 (not shown). Prior to the application of the liquid or liquid sample for treatment, the raised silicone strip is peeled away from the upper surface 12 of the slide 10, leaving a residual coating comprising a containment border 16 in accordance with the present invention. After the raised silicone rubber strip has been peeled away leaving the containment border 16, the analytic plate can be used in accordance with the present invention.

It is another distinctive characteristic of the present invention that after the coating is applied to the slide 10 to form the containment border 16 and the coating material has dried thereon, the containment border 16 is highly resistant to chemical removal and physical removal by washing, scrubbing, soaking in acids, alkalis, organic solvents, and aqueous solvents. The slide 10 can therefore be used repeatedly without losing its functionality.

The containment border 16 of the present slide 10 is further distinguished from prior art slides with borders which have teflon borders or other physical barriers because the surface of such prior art slides must be treated before the teflon coating can adhere to the slide (e.g., using an adhesive) thus causing solvents to dissolve the adhesive and the subsequent loss of the borders efficiency due to peeling and/or loss of the liquid confinement integrity of the border. The borders of slides using coatings of teflon, epoxy, or paint are generally opaque and are raised above the surface of the slide, unlike the borders on the slides of the present invention. In the present invention, there is no intervening layer (e.g., an adhesive) between the glass and the coating comprising the containment border 16.

Figure 2A:
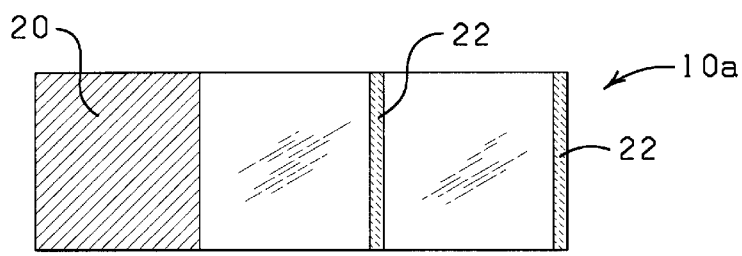
FIG. 2A is a plan view of another version of a microscope slide constructed in accordance with the present invention.
Figure 2B:
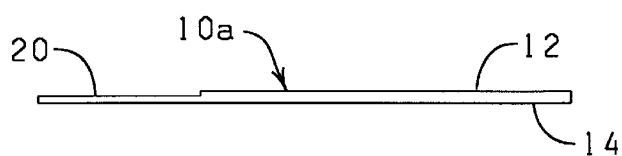
FIG. 2B is a side view of the slide of FIG. 2A.
Figure 3:
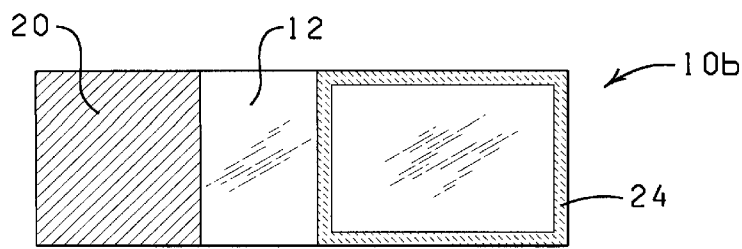
FIG. 3 is a plan view of another version of a microscope slide constructed in accordance with the present invention.
Figure 4:
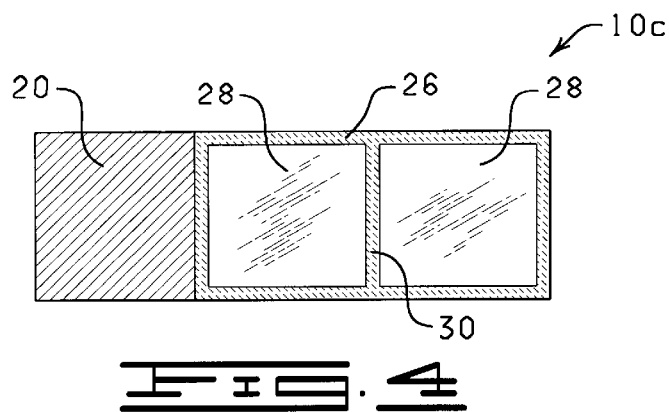
FIG. 4 is a plan view of another version of a microscope slide constructed in accordance with the present invention.
Figure 5:
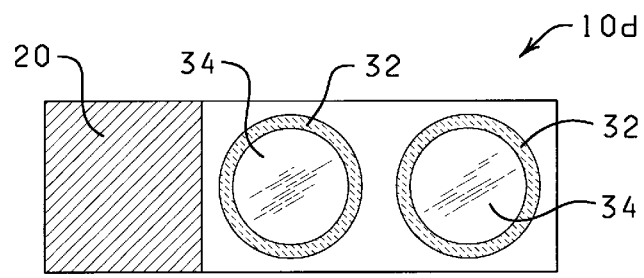
FIG. 5 is a plan view of another version of a microscope slide constructed in accordance with the present invention.
Figure 6:
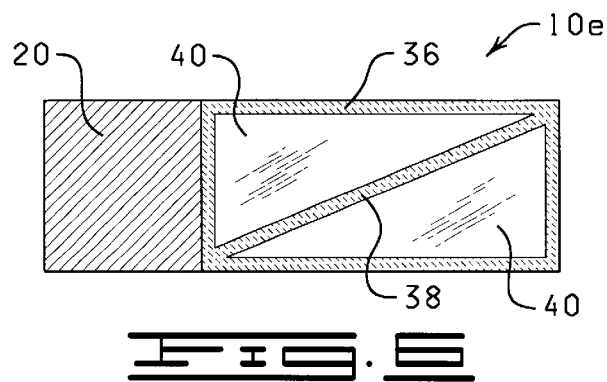
FIG. 6 is a plan view of another version of a microscope slide constructed in accordance with the present invention.

Although the microscope slide of the present invention may consist solely of a slide 10 with the containment border 16 thereon, in some embodiments the slide may further have a distinct marking surface thereon for writing upon or for attaching a label thereto. FIGS. 2A and 2B show such a slide, designated therein by the general reference numeral 10a. The slide 10a has a marking surface 20 which is a "frosted" portion of the slide 10a (i.e., a portion of the slide 10a which has been etched off or abraded). In an alternative version of such a slide, the marking surface 20 may be an opaque epoxy or painted coating. Other means of forming a marking surface will be apparent to one of ordinary skill in the art. FIG. 2A further shows an alternative version of the invention wherein the containment border, designated by the general reference numeral 22 comprises a pair of strips extending from one edge of the slide to another, rather than forming a box pattern as shown in slide 10a. FIG. 3 shows a slide 10b which is essentially the same as slide 10a except the containment border is a border 24 which forms an entire "box" on the surface 12 of the slide 10b. FIG. 4 shows an alternative embodiment of the invention, a slide 10c having a containment border 26 which comprises a pair of separate containment areas 28. The separate containment areas 28 can therefore contain separate samples which are prevented from mixing by the portion 30 of the containment border 26 which separates the two containment areas 28. Although not specifically shown in the figure, the slide 10c may be constructed to comprise a plurality of separate containment areas 28 greater than two for holding a plurality of samples, as will be understood by a person of ordinary skill in the art. FIG. 5 shows a slide 10d having a pair of circular containment borders 32 which surround containment areas 34. Alternative versions of slide 10d may have only a single circular containment border 32, or may have a plurality of circular containment borders 32. FIG. 6 shows a slide 10e comprising a containment border 36 having a diagonal border 38 extending thereacross forming a pair of triangle shaped containment areas 40. Alternative versions of the slide 10e may have only a single triangle shaped containment area 40, or may have a plurality of areas 40. Further, it will be understood by a person of ordinary skill in the art that the shapes of the containment areas are not limited only to those shown in the figures herein. The containment areas may have other shapes, such as ovals, stars, ellipses, pentagons, hexagons, trapezoids, or even non-geometric or fanciful shapes. Further, a single slide may have more than one particular shape of containment border disposed thereon, for example, a circle and a box or a pair of circles and a pair of boxes.

As is evident from the above, each slide contemplated herein has only a portion of the surface thereof coated with the coating material, with the specific purpose for retaining a liquid or liquid sample upon a discrete and predetermined portion of the slide.

In an alternative embodiment of the invention, one or more of the microscope slides or plates contemplated herein may be supplied as a kit along with other components used in microscopic analysis of samples. Said other components may comprise stains and reagents commonly used by those of ordinary skill, including but not limited to, stains, dyes, molecular biological reagents including monoclonal and polyclonal antibodies, and molecular probes and their detection reagents, and other aqueous and non-aqueous processing reagents. Examples of aqueous and non-aqueous processing reagents include xylene, toluene, acetone, and other organic and inorganic solvents, and alcohols, biological buffers, and aqueous reagents for use with antibodies, and molecular probes and their detection reagents.

Further, the examples described herein are not intended to limit the scope of the invention.

Changes may be made in the construction and the operation of the various components, elements and assemblies described herein or in the steps or the sequence of steps of the methods described herein without departing from the spirit and scope of the invention as defined in the following claims.

What is claimed is:

1. An analytic plate, comprising:

a glass plate having an upper surface and lower surface and having a containment border on a portion of said upper surface, the containment border surrounding a containment area for containing an aqueous or non-aqueous liquid or liquid sample and which substantially prevents the migration of the aqueous or non-aqueous liquid or liquid sample from the containment area to portions of the upper surface of the plate outside of the containment border, and wherein the containment border is transparent and has a thickness of less than 0.00001 inch.

2. The analytic plate of claim 1 further comprising a visible border on the lower surface.

3. The analytic plate of claim 1 wherein the containment border is colored.

4. The analytic plate of claim 1 wherein the containment border is invisible.

5. The analytic plate of claim 1 wherein the containment border has a thickness of a molecular layer.

6. The analytic plate of claim 1 having printed information thereon indicating the position of the containment border, the printed information further comprising lines, numbers, or other symbols.

7. The analytic plate of claim 1 wherein the containment border is preapplied before the application of the liquid or liquid sample.

8. The analytic plate of claim 1 wherein the containment border comprises a coating comprising a polysiloxane composition.

9. The analytic plate of claim 8 wherein the polysiloxane composition comprises an alkyl polysiloxane.

10. A kit for microscopic analysis, comprising:

at least one analytic plate comprising:

a glass plate having an upper surface and having a containment border on a portion of said upper surface, the containment border surrounding a containment area for containing an aqueous or non-aqueous liquid or liquid sample and which substantially prevents the migration of the liquid or liquid sample from the containment area to portions of the upper surface of the plate outside of the containment border, and wherein the containment border is transparent and has a thickness of less than 0.00001 inch; and a reagent for treating a biological sample disposed upon the analytic plate.

11. The kit of claim 10 wherein the analytic plate further comprises a visible border on the lower surface.

12. The kit of claim 10 wherein the containment border of the analytic plate is colored.

13. The kit of claim 10 wherein the containment border of the analytic plate is invisible.

14. The kit of claim 10 wherein the containment border of the analytic plate has printed information thereon indicating the position of the containment border, the printed information further comprising lines, numbers or other symbols.

15. The analytic plate of claim 10 wherein the containment border is preapplied before the application of the liquid or liquid sample.

16. The kit of claim 10 wherein the containment border of the analytic plate has a thickness of a molecular layer.

17. The kit of claim 10 wherein the containment border of the analytic plate comprises a coating comprising a polysiloxane composition.

18. The kit of claim 17 wherein the polysiloxane composition comprises an alkyl polysiloxane.

19. The kit of claim 10 wherein the reagent is selected from a group of stains and biological reagents consistent with medical diagnosis comprising stains, dyes, aqueous and non-aqueous processing reagents, and molecular biological reagents and their detection reagents.

20. The kit of claim 19 wherein the aqueous and non-aqueous processing reagents further comprise xylene, toluene, acetone, alcohols, biological buffers, monoclonal and polyclonal antibodies, molecular probes and their detection reagents.

21. A method of using an analytic plate, comprising:

providing a glass plate having an upper surface and a lower surface and having a containment border on a portion of said upper surface and wherein the containment border surrounds a containment area for containing an aqueous or non-aqueous liquid or liquid sample, the containment border able to substantially prevent the migration of the liquid or liquid sample from the containment area to portions of the upper surface of the plate outside of the containment area, and wherein the containment border transparent and has a thickness of less than 0.00001 inch; and applying the liquid or liquid sample to the containment area of the analytic plate.

22. The method of claim 21 wherein the liquid or liquid sample applied to the plate is selected from a group of stains and biological reagents consistent with medical diagnosis comprising stains, dyes, aqueous and non-aqueous processing reagents, and molecular biological reagents and their detection reagents.

23. The method of claim 22 wherein the liquid or liquid sample is an aqueous or non-aqueous processing reagent selected from the group consisting of xylene, toluene, acetone, alcohols, biological buffers, monoclonal and polyclonal antibodies, molecular probes and their detection reagents.

24. An analytic plate, comprising:

a glass plate having an upper surface and lower surface and having a containment border on a portion of said upper surface, the containment border surrounding a containment area for containing an aqueous or non-aqueous liquid or liquid sample, and wherein the containment border is transparent and has a thickness of less than 0.00001 inch.

25. The analytic plate of claim 24 further comprising a visible border on the lower surface.

26. The analytic plate of claim 24 wherein the containment border is colored.

27. The analytic plate of claim 24 wherein the containment border is invisible.

28. The analytic plate of claim 24 wherein the containment border comprises a coating comprising a polysiloxane composition.

29. The analytic plate of claim 24 having printed information thereon indicating the position of the containment border, the printed information further comprising lines, numbers, or other symbols.

30. The analytic plate of claim 24 wherein the containment border is preapplied before the application of the liquid or liquid sample.

31. An analytic plate, comprising:

a glass plate having an upper surface and lower surface and having a containment border on a portion of said upper surface, the containment border surrounding a containment area for containing an aqueous or non-aqueous liquid or liquid sample, and wherein the containment border comprises a polysiloxane or silicone layer which is transparent and has a thickness of less than 0.00001 inch.

32. The analytic plate of claim 31 further comprising a visible border on the lower surface.

33. The analytic plate of claim 31 wherein the containment border is colored.

34. The analytic plate of claim 31 wherein the containment border is invisible.

35. The analytic plate of claim 31 having printed information thereon indicating the position of the containment border, the printed information further comprising lines, numbers, or other symbols.

36. The analytic plate of claim 31 wherein the containment border is preapplied before the application of the liquid or liquid sample.

37. An analytic plate, comprising:

a glass plate having an upper surface and lower surface and having a containment border on a portion of said upper surface, the containment border surrounding a containment area for containing an aqueous or non-aqueous liquid or liquid sample, and wherein the containment border has a thickness of less than 0.00001 inch and is highly resistant to removal.

38. The analytic plate of claim 37 wherein the containment border is preapplied before the application of the liquid or liquid sample.

39. An analytic plate, comprising:

a plastic or ceramic plate having an upper surface and lower surface and having a containment border on a portion of said upper surface, the containment border surrounding a containment area for containing an aqueous or non-aqueous liquid or liquid sample, and wherein the containment border is transparent and has a thickness of less than 0.00001 inch.

* * * * *